United States Patent [19]
Melnychyn et al.

[11] 3,764,711
[45] Oct. 9, 1973

[54] ACYLATED PROTEIN FOR COFFEE WHITENER FORMULATIONS

[75] Inventors: Paul Melnychyn, Northridge, Calif.;
Ronald B. Stapley, Bellevue, Wash.

[73] Assignee: Carnation Company, Los Angeles, Calif.

[22] Filed: Mar. 29, 1971

[21] Appl. No.: 129,149

Related U.S. Application Data

[63] Continuation-in-part of Ser. No. 672,685, Oct. 2, 1967, abandoned.

[52] U.S. Cl.................. 426/201, 426/364, 426/213, 426/212
[51] Int. Cl............................................. A23c 11/00
[58] Field of Search .................... 99/63, 64, 18, 14, 99/17, 20, 98; 260/112 R, 119, 123.5

[56] References Cited
UNITED STATES PATENTS
2,728,759  12/1955  Keil..................................... 99/14 X
2,729,628  1/1956  Mann............................... 260/123.5

Primary Examiner—Raymond N. Jones
Assistant Examiner—James Robert Hoffman
Attorney—Robert D. Kummel and Eugene C. Ziehm

[57] ABSTRACT

A modified, edible protein suitable for use in human foods is provided by contacting an essentially unhydrolyzed edible protein dispersed in an aqueous alkaline medium with a modifying agent capable of acylating the functional groups of the protein which are electronegative in character and have replaceable hydrogen atoms for a period of time sufficient to provide an essentially unhydrolyzed modified protein having at least about 30 acyl groups per $10^5$ grams of protein. The modified protein may be used in a variety of food products and is particularly well suited for use in coffee whitener formulations.

22 Claims, No Drawings

ACYLATED PROTEIN FOR COFFEE WHITENER FORMULATIONS

RELATED APPLICATIONS

This application is a continuation-in-part of co-pending application Ser. No. 672,685 filed Oct. 2, 1967 for Protein now abandoned.

BACKGROUND OF THE INVENTION

This invention relates to a method of providing a modified edible protein suitable for use in foods for human consumption and to the product of the method. More particularly, the invention relates to providing an essentially unhydrolyzed modified, edible protein which has a mild flavor and odor and a non-feathering characteristic when contacted with beverages such as coffee and tea, and to formulations including such a modified, edible protein.

In view of the increasing need for high quality nutrition, it is of considerable importance to provide a relatively simple method of obtaining nutritionally rich protein which does not possess an objectionable flavor, odor, or taste and is suitable for use in foods for human consumption. In order to provide such a product, attempts have been made heretofore to isolate vegatable protein, such as protein derived from soy beans, peanuts, sesame seeds, and the like, for use in human foods. Thus, a conventional procedure for obtaining soy protein fom soy beans is to perform an aqueous alkaline extraction at elevated pH and then to precipitate the protein at its isoelectric point. However, the flavor, tate, odor, and in some instances other characteristics of such soy protein products, usually have been somewhat undesirable. Accordingly, use of such vegetable protein in human foods has not developed as rapidly as possible.

Also, it has been found that such conventionally isolated vegetable proteins are not suitable for use in situations where the protein contacts substantial concentrations of coffee, tea, and beverages of similar composition such as use in coffee whitener formulations. Under such circumstances, the protein "feathers," that is, precipitates or coagulates. It is not known what specific agents in the coffee and tea are responsible for this "feathering" reaction. However, this may be due to caffeic, chlorogenic and/or tannic acids, therein, which are capable of forming salts or complexes with the basic amino functional groups of the protein, i.e., epsilon amino groups, so as to cause precipitation. Also, most water soluble proteins tend to coagulate when subjected to heat. Proteins other than vegetable protein isolates, such as casein, sodium caseinate, etc., when used in coffee whitener formulations, also are subject to such feathering under some conditions, such as when contacted with coffee beverages of the freeze-dried instant type.

SUMMARY OF INVENTION

The present invention comprises a method of providing a modified edible protein which has a mild flavor and odor so that it can be used in substantial concentrations in human foods. The modified protein produced by this invention is essentially unhydrolyzed, has a reduced viscosity and, although modified in chemical structure, does not in any way exhibit impairment of its essential amino acid content. Moreover, it does not "feather" in usual concentrations of tea or coffee.

The method by which this modified protein is produced is relatively simple and is quite rapid so that it can be carried out completely in a few minutes using readily available reagents and equipment. Generally, the modified protein is produced by contacting an aqueous alkaline medium, containing an essentially unhydrolyzed edible protein, with a modifying agent which contains acyl groups and is capable of reacting with functional groups of the protein which are electronegative in character and have replaceable hydrogen atoms. Thus, the modified protein may be prepared directly from a proteincontaining vegetable material by addition of a modifying agent to an aqueous alkaline medium containing such vegetable material. As will be discussed in more detail hereinbelow, other types of protein source materials may also be used. It is believed that most of the acyl groups of the modifying agent react with the basic amino functional groups of the protein, that is, epsilon amino groups, to block such sites by acylation thereof. In addition, the acyl groups also react with other functional groups such as hydroxyl groups of serine, threonine or tyrosine. The modified protein thus formed may be recovered from the aqueous alkaline medium, such as by precipitation at about its isoelectric point, which is modified in the reaction, i.e., lowered by about 0.5 pH units, or may be utilized in the aqueous alkaline reaction medium. The reaction conditions are rapid to avoid substantial hydrolysis of the protein. Moreover, a relatively high weight-to-volume ratio of protein to aqueous alkaline medium is employed to provide conditions which favor the reaction of the modifying agent with the protein and suppress hydrolysis of the modifying agent used in the modifying reaction.

The protein material which may be used in this invention includes vegetable proteins in any suitable form, such as beans, flakes, meal, extracts, and isolates, animal proteins such as casein, salts derived from animal protein such as sodium caseinate and combinations thereof. According to one embodiment of the invention, when a protein-containing vegetable material such as beans, flakes, or meal is used, protein is extracted from the source material in the aqueous alkaline medium as a first step. The modifying reaction is then carried out by contacting the aqueous alkaline medium with the modifying agent. This modifying reaction may be carried out without first separating the extracted protein from the protein source material, thereby reducing the amount of equipment, time, and expense needed to produce the modified protein. The modified protein may be recovered from the reaction medium for use in a food formulation. Alternatively, the modified protein may be retained in the reaction medium and the aqueous medium containing the modified protein combined with other desired food ingredients such as in preparing a coffee whitener formulation.

DESCRIPTION OF PREFERRED EMBODIMENTS

Referring more particularly to the steps of the present method, an edible protein source, preferably in comminuted form, is contacted with a suitable quantity of water and alkalizing agent to provide a protein dispersion in the aqueous alkaline medium. The alkalizing agent may be, for example, sodium hydroxide, sodium carbonate, or another water-soluble alkaline reagent, such as trisodium phosphate, calcium hydroxide, ammonium hydroxide, triethylamine or tributylamine.

The concentration of the alkalizing agent should be such as to provide an aqueous alkaline medium having a pH of about 7.5–12.5 and preferably about 8.5–11.5. For example, trisodium phosphate is usually utilized in a concentration of about 0.2–0.8 N. Calcium hydroxide concentrations of about 0.06–0.4 M are suitable, while 0.06–0.2 M concentrations of ammonium hydroxide have been used and 0.1–0.2M concentrations of tributylamine, and 0.7M or greater concentration of sodium hydroxide.

Any suitable ratio of protein source to aqueous alkaline medium can be used. However, the more dilute the resulting dispersion, the greater is the likelihood of hydrolysis of the modifying agent subsequently added, thereby resulting in waste of the modifying agent. Generally, it is preferred to add about one part by weight (in grams) of protein source to three or four parts by volume (in milliliters) of aqueous alkaline medium. However, ratios of one part by weight of protein source to ten or more parts by volume of aqueous alkaline medium have been used successfully.

A wide variety of protein sources can be used in the present invention. Representative of such materials are protein-containing vegetable materials such as soy beans, peanuts, sesame seeds, safflower seeds, cottonseed, and grain (barley, oats, etc.), protein extracts and isolates of such vegetable materials, animal protein such as casein and calcium caseinate; salts derived from animal protein such as sodium caseinate; and combinations thereof. Protein-containing vegetable material contacted with the aqueous alkaline medium may be in any suitable form which provides an adequate degree of contact with the aqueous medium, such as in the form of flakes, meal, flour, and the like, advantageously in comminuted form, for example 60 mesh. Protein-containing vegetable material used is preferably in somewhat refined form, for example, defatted soybean flakes, defatted soybean meal, or the like. The protein-containing vegetable material contacted with the aqueous alkaline medium may, if desired, also be in the form of whole beans, seeds, etc. When such whole beans or seeds are used as the protein source material, they are comminuted, as by high speed impact milling, while in contact with the aqueous alkaline medium to extract protein from the source material.

When a protein-containing vegetable material is used as the protein source, extraction of protein from the vegetable material takes place when the vegetable material is contacted with the aqueous alkaline medium, thereby providing a dispersion of the protein in the medium.

The aqueous alkaline medium containing protein dispersed therein is contacted with at least one of the modifying agents described hereinbelow. The period of time between the addition of the protein source and the modifying agent to the aqueous alkaline medium can be relatively short, for example, about one minute. Times longer than one minute also can be used if desired. Stirring of the aqueous medium is advocated, particularly when the protein source is a protein-containing vegetable material, in order to increase contact of the protein source with the alkaline medium and thus facilitate extraction of the protein from the vegetable material.

The temperature of the aqueous alkaline medium, prior to the addition of the modifying agent, may vary widely from about room temperature (70°–75° F.) to about 220°F. Temperatures above about 150° F. facilitate extraction of protein from protein-containing vegetable material so that a relatively short period of extraction, for example, about 30 seconds to 5 minutes, may be used. Also, if a protein-containing vegetable material is used as the protein source, the stability of the modified protein, obtained from such vegetable material, when used in a coffee whitener formulation is improved when the temperature of the aqueous alkaline medium is above about 150° F. It is to be understood, however, that protein extraction from a protein-containing vegetable material may also be effected at temperatures below about 100° F. The temperature and time of protein extraction must not be sufficient to result in any substantial hydrolysis of the protein. However, when a vegetable protein is used as the protein source, the temperature of the aqueous alkaline medium should not be substantially above about 100° F., and preferably should be about 80°–90° F., when the modifying agent is added. Thus, if the temperature of the aqueous medium is above about 150° F. during extraction of protein from a protein-containing vegetable material, the temperature of the aqueous medium should be reduced to below about 100°F. prior to addition of the modifying agent.

The modifying agent may be added directly to the aqueous alkaline medium containing the protein, with or without the protein source also being present. When a protein-containing vegetable material is used as the protein source, the modifying agent is added after extraction of protein from the vegetable material is under way and preferably substantially completed, for example, in about 1 minute. There is no necessity to separate the vegetable material from the aqueous alkaline medium before addition of the modifying agent, although this separation step can be carried out if desired. Moreover, some extraction of protein from the vegetable material continues during the time of contacting with the modifying agent.

The modifying agent can be present in any suitable concentration sufficient to essentially completely react with the protein in the alkaline medium. For most purposes, the concentration of the modifying agent can be relatively small, that is, about 1 to 8 percent, and preferably about 2.5 to 6 percent, based on the weight of the protein source. The most desirable concentration for the modifying agent will depend concentration for the concentration of the protein source, the particular modifying agent selected, the temperature and time employed in the modifying reaction, and the intended use of the modified protein.

The modifying agent of the present invention is an acyl-containing compound capable of reacting with (i.e., acylating) the functional groups of the protein which are electro-negative in character, such as oxygen, sulfur, or nitrogen, and which have replaceable hydrogen atoms to provide sites for reaction with this agent. Suitable modifying agents include acyl-bearing anhydrides, either internal or external, such as monocarboxylic acid anhydrides (for example, acetic anhydride, propionic anhydride), and dicarboxylic acid anhydrides (for example, succinic anhydride, maleic anhydride); ketene; lactone compounds such as beta-propionlactone and diethylpyrocarbonate; and mixtures thereof. Other suitable acylating agents which do not adversely affect the viscosity and which do not impair the essential amino acid content and nutritional value of the protein may also be used.

The reaction between the modifying agent and the protein is generally carried out at room temperature (70°–80° F.) or any other suitable temperature. Temperatures below about 100°F. are preferred in order to minimize hydrolysis of the modifying agent. It will be understood, however, that temperatures above about 100° F. may be used, particularly when the protein source is an animal protein or a salt derived from an animal protein. To facilitate contact between the modifying agent and the protein, the slurry or solution is stirred during the modifying reaction. The modifying reaction is completed in a relatively short period of time, for example, within about 1 to 5 minutes. It has been found that the modifying reaction is substantially complete within this short period of time even when the protein source material is not separated from the aqueous medium prior to the addition of the modifying agent. Longer periods of reaction may be used but generally are not advantageous.

The pH of the aqueous medium containing the protein at the time of adding the modifying agent is preferably about 9.5–12.5, but may be as low as about 8.5. During the modifying reaction, any hydrolysis which tends to produce acidic radicals from the modifying reagent results in a gradual reduction in the pH of the aqueous medium. For example, acetic anhydride is partially hydrolyzed to acetic acid, which reacts with the alkaline agent in the aqueous medium to reduce the pH thereof. Thus, the final pH after completion of this stage of the procedure may be as low as about 5.5 and usually is not above about 8.5, but preferably is between about 7.0–8.2. In those instances where the modifying agent is not substantially hydrolyzed to a form which reacts with the alkalizing agent, acid preferably is added to lower the pH to below a point where there is any substantial risk of alkaline hydrolysis of the protein.

After the completion of the modifying reaction, the modified protein may be recovered from the aqueous alkaline medium, such as by precipitation at about its isoelectric point. Alternatively, the modified protein may be retained in the aqueous reaction medium and the reaction medium, containing the modified protein, together with other products of the reaction, may be incorporated in a food formulation, such as a coffee or tea whitener formulation. If the modified protein thus produced is isolated, it is desirable to facilitate recovery thereof, as by adding a large quantity of water at an elevated temperature, for example, about 110°–120° F. Usually, the final weight-to-volume ratio of the protein source to the aqueous medium after such dilution is about 1:10. The diluted medium may be allowed to stand, for example, for about 1 minute, after which the modified protein is recovered. Thus, the protein-containing reaction medium is then separated from the protein source material (if still present), as by centrifugation, filtration, or the like, after which the modified protein is isolated by precipitation at about its isoelectric point. This is accomplished by acidifying the aqueous solution preferably to a pH of about 4.0–4.5, although acidification to a pH of about 3.5–5.0 will also accomplish precipitation of most of the modified protein. The acidifying agent can be any suitable acid, for example, hydrochloric acid, which reacts with the alkalizing agent to form a water soluble salt readily removable from the modified protein. The precipitated protein can then be separated by centrifugation, filtration, or the like from the aqueous acidic solution, and subsequently can be washed to remove residual concentrations of acid, salts, etc. and then dried. The modified protein thus recovered may be utilized in its isoelectric form. If desired, the modified protein can be neutralized before drying. In a typical procedure, the protein precipitate is water-washed, centrifuged, the resulting precipitate is usually dissolved in aqueous sodium hydroxide solution, then adjusted to pH 7, vacuum concentrated about threefold or fourfold, for example, at about 100° F. or below in order to remove volatiles and improve flavor and odor of the product. It may then be lyophilized (freeze dried), spray dried, or the like, to provide the finished modified protein in dry powder form suitable for addition to or in the compounding of human foods as a protein nutrition source.

Alternatively, the modified protein may, if desired, be utilized in the aqueous reaction medium. Thus, after completion of the modifying reaction, the aqueous medium containing the modified protein, together with other products of the reaction, may be combined with other desired food ingredients such as in preparing a coffee whitener formulation.

The modified protein formed by the present invention, when derived from a protein-containing vegetable material, has a phytin content of usually less than 60 percent by weight than that of protein obtained from such vegetable materials only by alkaline extraction. Phytin comprises salts of phytic acid naturally occuring in association with vegetable proteins such as soy protein and acts as a strong chelating agent for polyvalent ions. Apparently, phytin and soyprotein can become linked together into a complex by combination of free amino groups of the protein and strong acid groups of phytin. The present method appears to block such free amino acid reactive sites by acylation thereof, so that phytin complexes with the protein to a lesser extent.

As noted hereinabove, the modified protein of the present invention has a reduced viscosity, a lowered isoelectirc point, a mild flavor, substantially no odor and an over-all pleasant taste so that it is suitable for use in substantial amounts in foods for human consumption. The modified protein contains at least about 30 or more acyl groups per $10^5$ grams of protein covalently bonded to the protein. Tests have indicated that feathering of the protein in beverages such as coffee and tea most usually results when fewer than 20–30 acyl groups are bonded to the protein. Acyl groups may be covalently bonded to essentially all of the functional groups of the protein which are electronegative in character and have replaceable hydrogen atoms to provide a modified protein which has a mild flavor and odor and can be used in foods for human consumption.

If desired, the flavor of the modified protein, which has been derived from a protein-containing vegetable material, may be further improved by adding a treating agent to the aqueous alkaline medium prior to the addition of the moditying agent. Thus, a treating agent may be added to the aqueous medium prior to, during, or after extraction of protein from the vegetable material. The treating agent must exhibit at least some solubility in water. Suitable treating agents include halogens such as chlorine or bromine; inorganic salts containing both halogen and oxygen such as potassium iodate, sodium chlorate, sodium chlorite, potassium bromate, or the like; inorganic persulfates such as sodium persulfate, ammonium persulfate or the like; and mixtures thereof. An azodiamide such as azodicarbonamide, or an active sulfhydryl-bearing reagent such as dithiothreitol, mercaptoethanol, or cysteine, capable of reacting with disulfide linkages in the vegetable protein may also be used as the treating agent. The concentration of the treating agent in the aqueous medium can be quite small, for example, about $1.4 \times 10^{-3}$ M the like. Greater concentrations may be used if desired as long as the concentration of treating agent is below that which imparts an undesirable residual flavor of the treating agent to the protein. When chlorine is used as the treating agent, a typical concentration is about 0.1–0.3 percent by weight of the protein source (flakes, meal, or the like). This is usually about 0.01–0.03 percent by weight of the aqueous medium, since the usual weight ratio of protein source to medium is about 1:10, as previously indicated. The most desirable concentration for the treating agent will depend on the concentration of the protein source, the particular agent or agents selected, and the temperature and time conditions employed in contacting the treating agent with the protein. It will be understood that the addition of the treating agent to the aqueous medium is optional, since the modified protein which has not been so treated has a mild flavor. However, in some instances, it may be preferred to employ the treating agent for some further flavor improvement of the protein.

As discussed hereinabove, the modified protein of the present invention is suitable for use in foods for human consumption. The non-feathering characteristic makes the modified protein particularly well suited for use in a coffee whitener formulation. Such a coffee whitener formulation is basically a fat emulsion product which disperses readily in hot liquid, imparts that degree of whitening necessary for creaming coffee or tea, provides a pleasing taste and flavor comparable to that associated with coffee cream, and does not feather when introduced into the hot beverage. A typical formulation for a dried coffee whitener formulation of this invention comprises:

| Water soluble sugar | 64%–35% |
| Edible fat | 20%–50% |
| Modified protein | 3% –15% |
| Stabilizing salt | 0.5%–5% |
| Conventional Emulsifier | 1%–3% |

Any suitable edible fat or oil, either animal or vegetable, or combinations of such edible fats or oils, may be used. A fat or oil having a relatively low melting point and a narrow plastic range is desirable. Generally, it is preferred to use hydrogenated coconut oil since it has a relatively bland taste and flavor and imparts that degree of whitening necessary for creaming coffee. Other edible fats or oils such as cotton seed oil, corn oil, or the like, may, of course, also be used.

The water soluble sugar can be of any type, such as, for example, sucrose, lactose or corn syrup solids. The stabilizing salt used in the formulation is added as a buffering agent to counteract the acidity of the coffee and improve the colloidal dispersibility of the protein. Suitable stabilizing salts include phosphate salts of sodium and potassium such as dipotassium phosphate. The emulsifier can be of any suitable type such as used in conventional fluid fat emulsion products, such as, for example, mono- and diglycerides, diacetyl tartaric acid esters of mono- and diglycerides, propylene glycol monostearate or combinations thereof. If desired, nutritive additives such as carotene, riboflavin, etc., anticaking agents, and flavoring may be included in the formulation. The modified protein incorporated in the formulation has emulsifying properties and retains its emulsifying properties even after the formulation is subjected to drying procedures, such as, for example, spray drying. In contrast, it has been found that if a liquid emulsion of a fat or oil is emulsified only by conventional emulsifiers, the emulsifying characteristics of such conventional emulsifiers are ineffective following spray drying procedures. As discussed hereinabove, modification of the protein, in accordance with the procedure of this invention, prevents the protein from feathering when the formulation is added to coffee or tea.

In preparing the coffee whitener formulation, it is generally preferred to intimately blend a mixture of the edible fat, water, soluble sugar, conventional emulsifier, and modified protein into a homogeneous mass by suitable mechanical means. This mixture is then gradually added with agitation to water having an elevated temperature, for example between about 160°–180° F., so that a water-fat emulsion is obtained. The amount of water and the level of solids added to it are such that the preferable ratio is 40 to 60 percent. The water-fat emulsion is then pasteurized, homogenized, and then subjected to drying procedures. Any conventional drying procedure is used, but it is generally preferred to spray dry the emulsion to provide a product having a moisture content below 5 percent. The resulting product disperses readily in coffee and gives excellent whitening in coffee with no feathering of the protein or separation of the fat.

In order to illustrate the invention even more fully, the following specific examples are set forth. These examples are presented for illustrative purposes only and are not intended to limit the scope of the invention in any manner. Unless otherwise indicated, all parts and percentages are by weight.

EXAMPLE I 100 g. of finely ground soy bean flakes which had been defatted by conventional hexane extraction were contacted with 400 ml. of water containing 3.3 g. of sodium hydroxide. The water temperature was 75° F. and the resulting slurry was stirred for 1 minute, after which 4 g. of acetic anhydride were added to the slurry, with stirring. Stirring of the slurry was continued for 3 minutes at 75° F., at the end of which time the modification reaction on the extracted soy protein was completed. Thereupon, 600 ml. of water at 120° F. were added to the slurry, and stirring was continued for 1 minute, the slurry then being centrifuged at 5,000 r.p.m. for five minutes to separate the modified soy protein-containing solution from the ground extracted soy flakes. The recovered extract was adjusted with hydrochloric acid from pH 7.5 to pH 4.0 to precipitate the modified soy protein and then centrifuged at 5,000 r.p.m. for five minutes, after which the extract was discarded and the recovered precipitate was then washed with 750 ml. of water at 100° F., and then centrifuged at 5,000 r.p.m. for 5 minutes. The purified precipitate was redissolved in sufficient aqueous sodium hydroxide solution to adjust the pH to 7.0 and was then concentrated under vacuum at about 100°F. from about 3 protein to about 12 percent protein and then lyophilized to a dry powder ready for use.

The dry powder product, designated Product A, when tested organoleptically, had a mild, slightly beany flavor, substantially no odor, and an over-all pleasant taste, so that it was found to be suitable for incorporation in substantial amounts in human food recipes. This product was compared with a soy protein product, designated Product B, prepared by the following procedure:

Two hundred g. of defatted soy bean flakes were mixed with 2,800 ml. of water and 5 g. of calcium oxide and allowed to stand at 80° F. for 1.5 hours. The resulting slurry was filtered over screens to recover 2,400 ml. of lime liquor. The spent flakes were combined with 2,300 ml. of water and 4 g. of sodium hydroxide at 120° F., and held at that temperature for ten minutes. This slurry was then separated, by screening, into 1,900 ml. of caustic liquor and a residue of spent flakes. The spent flakes were washed by reslurrying in 2,400 ml. of water at 145°F. for ten minutes and the slurry filtered to provide a wash liquor and washed spent flakes which were then pressed to provide an additional 200 ml. of wash liquor. All of the wash liquor (2,600 ml.) was combined with the lime liquor from the first extraction of the flakes. The combined liquor was then acidified to a pH of 4.6 by the addition of sulfur dioxide thereto, to precipitate protein from the liquor.

The resulting protein curd was then used as a starting material for alkaline hydrolysis by reslurrying the wet curd with the 1,900 ml. of caustic liquor obtained from the second extraction step above, and to this slurry was added 6.8 g. of calcium oxide and 9.6 g. of sodium carbonate with adjustment of the pH to 11.4 with additional sodium hydroxide. This alkaline protein solution was then agitated at 120° F. for five hours, so as to hydrolyze the same, after which it was treated with acetic anhydride for one hour at 120° F. and pH 8.5, the anhydride being in a concentration of 12 percent, by weight, based on the protein. The solution was treated with sulfur dioxide to pH 4.1 to precipitate the protein, which was then washed twice and centrifuged to separate it from the wash liquor. This protein product was then dissolved in aqueous sodium hydroxide to pH 7 and lyophilized. The final product is identified as Product B.

A subsequent experiment was carried out utilizing a procedure identical to the procedure for making Product B, except that the hydrolyzed protein instead of being acetylated and then precipitated was merely precipitated at pH 4.6, centrifuged at 5,000 r.p.m. for five minutes, separated from the liquor, washed twice, recentrifuged, and then dissolved in aqueous NaOH to a 10 percent concentration, adjusted to pH 7.0 and lyophilized to provide Product C.

Products B and C thus obtained were compared with Product A. It was found that precipitation of the hydrolyzed protein by sulfur dioxide increased the undesirable flavor and odor exhibited by Products B and C. However, even in a parallel run where hydrochloric acid was used in the procedure for the manufacture of Product C, i.e., to precipitate the protein product designated C', the flavor and odor were stronger and less desirable than those of Product A. In the preparation of Products B, C, and C', the soy protein thereof had been subjected at pH greater than 11 and over an extended period of time to elevated temperature, so that substantial hydrolysis had taken place, with the result that a distinct mercaptan odor occurred, even in the case of Product C', i.e. where the protein had been precipitated with hydrochloric acid. Where the hydrolyzed protein was acetylated prior to precipitation, i.e., as in the preparation of Product B, a sweet-sour odor which was highly objectionable was detected in place of the mercaptan odor. The acetylation, in effect, resulted in masking of the characteristic mercaptan odor manifest in proteins subjected to substantial alkaline hydrolysis. However, the odor and flavor of Product B was, in any event, less desirable than that of Product A.

Products A, B, C, and C' were examined by a flavor panel and it was found that when each of these proteins was tested as a 5 percent solution in water, Product A had by far the highest rating for acceptable odor and flavor. It was determined that both Product B and Product A were stable, that is, they did not feather or precipitate when 1 ml. of an aqueous solution containing 5 percent of the protein was added to 40 ml. of coffee containing a 2.5 percent concentration of instant coffee, all at a temperature of 160° F. However, under the same conditions, Products C and C' did feather in coffee.

Product B was quantitatively analyzed for acetyl groups, as was Product A, and so also was a protein Product D prepared from soy beans by aqueous alkaline (3 percent NaOH) extraction at pH 11 and 75° F. followed by precipitation at pH 4.0 using hydrochloric acid. Product A was found to contain 44 acetyl groups more per mole of protein (assuming an average molecular weight of 100,000) than Product D, while on the same basis, Product B contained only 26 acetyl groups more. Product D was used as the base-line, i.e., unacetylated control. It had an average of 22 acetyl groups per 100,000 g. of protein. In this regard, much of the acetic anhydride used in the preparation of Product B was hydrolyzed to acetic acid and was unavailable for acylation, so that that procedure was relatively inefficient. However, Product B did not show feathering, which may be due to the fact that a substantial portion of Product B was fragmented by hydrolysis and made more soluble. Hydrolysis resulted in some loss of Product B, in contrast to Product A.

Electrophoretic patterns were obtained and analyzed for Products A and B, and found to be substantially different, due to hydrolysis of the protein in the case of Product B. Specifically, the electrophoretic pattern for Product A exhibited distinct, intense bands, whereas in Product B, the bands attributable to the proteins were less discrete, i.e., diffused and smeared and the intensity of staining was markedly diminished. Accordingly, the proteins produced by the methods above described for obtaining Products A and B were shown to be distinctively different.

EXAMPLE II

In parallel runs, isolated peanut protein and sesame protein were each subjected to a procedure generally as set forth in Example I for the preparation of Product A, but substituting the following parameters and eliminating the alkaline extraction step: Modifying Reaction Aqueous medium—water containing 2% sodium carbonate based on the weight of protein.

Slurry—1:10 weight-to-volume ratio of protein to aqueous alkaline medium.

Modifying Agent—acetic anhydride in a 1%, by weight of solids, concentration.

Temperature—70°–75° F.
Time—1 hour.

After the modifying reaction, the slurry was diluted with water at 100° F. to decrease the protein concentration to 3 percent. The diluted modified protein in each instance was precipitated by addition of HCl to decrease the pH to 4.0. The precipitated protein was centrifuged, washed, recentrifuged, redissolved in aqueous NaOH solution at pH 7.0 and then used as neutral solution in formulating liquid coffee whitener. The coffee whitener in each instance had the following formulation:

| INGREDIENT | % Concentration (by weight) |
| --- | --- |
| Hydrogenated Coconut Oil (Iodine Value 3 max.) | 10.0 |
| Sugar | 1.0 |
| Corn Syrup Solids | 3.5 |
| Protein | 2.0 |
| Disodium Phosphate | 0.25 |
| Glyceryl Monostearate (emulsifier) | 0.75 |
| Carrageenan (stabilizer) | 0.40 |
| Water | 82.1 |
| Total | 100.00 |

In each instance, the liquid coffee whitener exhibited no feathering when used in conventional concentration (one teaspoonfull) in a freshly prepared instant coffee solution of conventional strength (one teaspoonful of coffee in 8 fluid oz. of water). No unpleasant or unusual taste or odor was imparted to the cofeee in any such instance when compared with coffee whitener of the same formulation except for substituting sodium caseinate for the protein solution prepared in accordance with the present invention.

EXAMPLE III

A 400 g. sample of hexane defatted soy flakes was extracted with 4,000 ml. of water at 100° F. for 2 hours. The extract was separated by filtration through a fibrous membrane and then concentrated under vacuum to 12.5 percent protein.

A 98 cc. sample of the extract was treated by addition thereto of 1.5 g. of sodium carbonate and 0.5 g. of succinic anhydride. The resulting solution was stirred for 1 hour at room temperature (pH 8.9), then diluted to 600 cc. and adjusted to pH 4.0 with hydrochloric acid. The precipitate was removed by centrifugation, washed with water, dissolved at pH 7.0 in aqueous sodium hydroxide solution and used in the liquid coffee whitener formulation set forth in Example II. A product which did not feather under the test conditions specified in Exhibit II and was free of objectionable odor and flavor was obtained.

Similar results are obtained when ketene, beta-propiolactone and diethylpyrocarbonate are used in suitable amounts as the modifying reagent under the reaction conditions set forth herein.

EXAMPLE IV

A 98 cc. sample of the concentrated protein extract described in Example III was treated with 1.5 g. of sodium carbonate and 0.5 g. of maleic anhydride in the manner otherwise described in Example III, and the same results as described in Example III were obtained.

EXAMPLE V

A 100 g. sample of ground lima beans was suspended in 1L. of water and stirred for 45 minutes at room temperature. Insoluble residue was removed by centrifugation and filtration. A 140 ml. portion of the clarified effluent was adjusted to pH 4.6 to precipitate the protein. The precipitate was recovered and freeze dried to yield 3.5 g.

A 2 g. sample of the recovered protein was suspended in 25 ml. of water and adjusted to pH 7.0 Additional sodium hydroxide was then added to adjust the pH to 9.0. This solution was treated with 2 ml. of acetic anhydride and stirred for 60 minutes at room temperature (70° Fo), then diluted with 75 ml. of water, and adjusted in pH to 4.0 to precipitate the protein. The precipitated protein was recovered by centrifugation and was then washed and dissolved at pH 7.0 in aqueous sodium hydroxide. The resulting solution was used in the liquid coffee whitener fomulation of Example III and results identical with those set forth in Example III were obtained, i.e., the protein was stable (did not feather), was odor free, and free of unpleasant taste.

EXAMPLE VI

The following procedure was used in preparing a dry, powered coffee whitener formulation containing modified casein which was not separated from the aqeuous alkaline medium after completion of the modifying reaction. According to this procedure, all of the reaction products are incorporated in the formulation thereby precluding the necessity of precipitating the modified protein from the reaction medium.

A 100 gm. sample of HCl casein was dissolved in 2000 gms. of water containing 8.9 gms. of sodium hydroxide at a temperature of 190° F. After about 4 min. solution time, 7.5 mls. of acetic anhydride was added and mixed for about 3 minutes. To this solution was then added approximately 1860 gms. of a liquid mixture containing about 61 percent by weight of corn syrup solids, 37 percent by weight of hydrogenated coconut oil, and 2 percent of an emulsifier blend containing mono- and diglycerides and diacetyl tartaric acid esters of mono- and diglycerides. This formulation was pasteurized at 155° F. for 20 minutes, homogenized and spray dried. The resulting product was used as a coffee whitener by adding one teaspoonful to a freshly prepared coffee solution of conventional strength (one teaspoonful of instant coffee in 8 fluid oz. of water) at 165° F. The product was an acceptable coffee whitener, there was no unpleasant or unusual taste or odor imparted to the coffee, and there was no feathering of the protein.

In order to test the stability of the modified casein under more stringent conditions, the coffee whitener formulation fo Example VI was added to 170 ml. of a 2 percent solution of a commercially available freeze-dried coffee at a temperature of 195° F. There was no feathering of the modified casein even under such test conditions. Similar results are obtained when other protein sources such as sodium caseinate, protein-containing vegetable materials, or vegetable protein extracts or isolates are used in place of the casein in this procedure.

EXAMPLE VII

The following procedure was carried out to provide a modified protein having even greater stability against feathering in coffee.

A slurry was prepared containing one part by weight (in gms.) of defatted soy flour to ten parts by volume (in mls.) of water containing sufficient sodium hydroxide to provide a pH of 10.2. The temperature of the slurry was raised to 170° F. for one minute and then rapidly cooled to 85° F. Acetic anhydride, in an amount equivalent to 6 percent by weight of the soy flour, was added to the slurry with stirring and the slurry agitated for about two minutes at 85° F., at the end of which time the pH of the aqueous slurry was 5.5. The slurry was then diluted with water, insoluble residue was separated by centrifugation and the modified protein, in dry powder form, recovered from the aqueous medium according to the procedure set out for Product A in Example I.

To test the stability of this modified protein against feathering, a 3 % solution of the modified protein in water was prepared and 4 ml. of this solution added to 170 ml. of a 2 percent solution of a commercially available freeze-dried coffee at a temperature of 195° F. The modified protein was stable and did not feather in the coffee. The modified protein was then subjected to a severe stability test in which its stability in coffee was tested as a fat-protein complex devoid of emulsifiers or buffering agents. In carrying out this severe stability test, 15 gms. of a hydrogenated coconut oil was added to 100 ml. of the 3 percent solution of the modified protein in water, the temperature of the fat-protein mixture raised to 140° F. and then the fat was melted, mixed, and homogenized. Four ml. of the fat-protein complex thus formed was added to 170 ml. of the 2 percent freeze-dried coffee solution at 195° F. in the absence of any emulsifiers. There was no feathering of the modified protein even under these severe test conditions. The severity of this test is indicated by the fact that when conventional casein or sodium caseinate, which are generally used in coffee whitener formulations, are tested as such a protein-fat complex in the absence of emulsifiers under these conditions, they exhibit feathering.

The modified protein produced in this example may be incorporated in a coffee whitener formulation by forming an intimate mixture of the following ingredients:

| | |
|---|---|
| Hydrogenated coconut oil | 350.0 lbs. |
| Corn syrup solids | 560.0 lbs. |
| Modified protein | 50.0 lbs. |
| Di-potassium phosphate | 20.0 lbs. |
| Pre-blend | 23.5 lbs. |
| | 1,003.5 lbs. |

The pre-blend has the following composition:

| | |
|---|---|
| Hydrogenated coconut oil | 7.0 lbs. |
| Mono- and diglycerides and diacetyl tartaric acid esters of mono- and diglycerides | 14.78 lbs. |
| Carotene | 7.6 gms. |
| Riboflavin | 5.8 gms. |
| Flavor | 1.7 lbs. |
| | 23.5 lbs. |

This mixture is gradually added to 540 lbs. of water having a temperature of 160°–180° F. to form a water-fat emulsion. The emulsion is pasteurized, homogenized at about 1,000–2,500 psi, and spray dried at an inlet temperature of 300°–350° F. and an outlet temperature of 170°–200° F. The spray dried product has the following composition:

| | |
|---|---|
| Corn syrup solids | 55.8% |
| Hydrogenated coconut oil | 35.6% |
| Modified protein | 4.98% |
| Di-potassium phosphate | 1.99% |
| Diacetyl tartaric acid esters of mono- and diglycerides | 0.118% |
| Mono- and diglycerides | 1.356% |
| Flavor | 0.17% |
| Carotene | 0.002% |
| Riboflavin | 0.001% |

This product, when added to a freshly prepared coffee solution of conventional strength, disperses readily in the coffee and imparts a whitening effect which closely duplicates that of dairy cream without any feathering of the protein. Similar results may be obtained when other protein sources such as casein, sodium caseinate, or other protein-containing vegetable materials are used as the protein source in the modification reaction.

It has been found that stability of the modified protein, when derived from a protein-containing vegetable material, against feathering is improved by heating the protein source to such a high temperature prior to the modification reaction, when the protein source has not been subjected to a prior heat treatment. Thus, the stability of non-heat treated protein containing vegetable materials, and non-heat treated extracts and isolates of such protein-containing vegetable materials may be increased by such a rapid heating of the aqueous alkaline medium. However, stability of a previously heat treated protein source, such as spray-dried extracts or isolates, is not affected by such a heating step.

EXAMPLE VIII

The procedure, materials, and conditions of Example VII were repeated with the exception that chlorine gas in a concentration of about 0.01 percent by weight of the water was added to the aqueous alkaline medium prior to the addition of the defatted soy flour. The modified protein produced by this procedure had an improved flavor and was stable against feathering when tested according to the procedures used in Example VII.

The preceding examples clearly illustrate the utility of the modified proteins of the present invention in coffee-whitener formulations. Further examples of applications of the modified proteins include their use in liquid and reconstitutable infant feeding formulas, in ersatz milk and other dairy-type products, as meat substitutes, additives and ingredients in cereal and bakery and in specialty food items. Their non-feathering characteristic makes these products particularly attractive for coffee whitener formulations, while their pleasant odor and flavor allow them to be used in substantial concentrations in a wide variety of food formulations. Moreover, the method of making them is economical from a commercial standpoint.

Various modifications, changes, and alterations can be made in the method of the present invention, its steps and parameters and in the products of the present invention. All such modifications, changes, and alterations as are within the scope of the appended claims form a part of the present invention.

We claim:

1. A method of producing an edible modified protein having improved odor and flavor and a non-feathering characteristic, which comprises
   providing an aqueous alkaline medium containing an essentially unhydrolyzed edible protein having epsilon amino groups, selected from the group consisting of vegetable protein, animal protein, salts derived from animal protein and combinations thereof, and
   contacting said protein in said aqueous alkaline medium wity a modifying agent selected from the group consisting of acyl-bearing anhydrides, ketene, and lactone compounds in a concentration and for a period of time sufficient for the modifying agent to essentially completely react with functional groups of said protein which are electronegative in character and have replaceable hydrogen atoms to provide an essentially unhydrolyzed edible modified protein having at least about 30 acyl groups per $10^5$ grams of protein.

2. The method defined in claim 1 in which said aqueous alkaline medium has a temperature of below about 100° F. and a pH of between 7.5 and 12.5 when contacted with the modifying agent.

3. The method defined in claim 1 in which the concentration of modifying agent in said aqueous medium is about 1 to 8 percent by weight of the protein source and the reaction between the modifying agent and the protein is essentially complete in about 1 to 5 minutes.

4. The method defined in claim 1 in which said aqueous medium containing essentially unhydrolyzed protein is provided by contacting an edible protein-containing vegetable material with an aqueous alkaline medium for a period of time sufficient to extract protein from said vegetable material without substantial hydrolysis of the protein and said modifying agent is contacted with said aqueous medium in the presence of said vegetable material.

5. The method defined in claim 4 in which the aqueous medium contacted with the protein-containing vegetable material has a pH of between 7.5 and 12.5 and a temperature between about 70° F. and 220° F. and the weight-to-volume ratio of said vegetable material to said aqueous medium is between about 1:3 to 1:10.

6. The method defined in claim 5 in which the temperature of the aqueous medium is between about 150° F.–220° F. whereby extraction of protein from the vegetable material is substantially complete within about 30 seconds to five minutes without substantial hydrolysis of the protein and the aqueous medium is thereafter cooled to below about 100° F. prior to the addition of the modifying agent.

7. The method defined in claim 4 in which a treating agent selected from the group consisting of halogens, inorganic persulfates, inorganic salts containing both halogen and oxygen, azodiamides and active sulfhydryl-bearing compounds capable of reacting with disulfide linkages in the vegetable protein is added to said aqueous alkaline medium prior to the addition of the modifying agent.

8. The method defined in claim 4 in which the protein-containing vegetable material is contacted with said aqueous alkaline medium at a temperature of about 150° F–220° F. for about 30 seconds to 5 minutes, said aqueous alkaline medium is rapidly cooled to a temperature below about 100° F., and said modifying agent is maintained in contact with said aqueous medium for about 1 to 5 minutes at which time the aqueous medium is diluted with water at a temperature of about 110° F.–120° F. and said modified protein is recovered therefrom.

9. The method defined in claim 1 in which the modified protein is recovered from the aqueous medium by acidifying said aqueous medium to about the isoelectric point of the modified protein to thereby precipitate the modified protein, separating the precipitated protein from the aqueous medium, washing the precipitated protein, and drying said precipitated protein.

10. The method defined in claim 9 in which the washed modified protein is dissolved in an aqueous sodium hydroxide solution at a pH of about 7 and said sodium hydroxide solution is concentrated and dried to provide modified protein in dry powder form.

11. The method defined in claim 1 in which the aqueous medium containing the modified protein is incorporated in a food formulation.

12. A modified edible protein suitable for use in foods for human consumption, said modified protein having at least about 30 acyl groups per $10^5$ grams of protein, having a mild flavor, essentially no odor, exhibiting absence of feathering in coffee and tea, being essentially unhydrolyzed, having a lowered phytin content, being essentially completely soluble after spray drying, having reduced viscosity, the electrophoretic pattern of which exhibits distinctive broad bands, and having an essentially unimpaired amino acid content.

13. The modified portein defined in claim 12 in which said modified protein is selected from the group consisting of vegetable proteins, animal proteins, salts derived from animal proteins, and combinations thereof.

14. The modified protein defined in claim 12 in which the modified protein is a vegetable protein essentially free of mercaptan and sulfurous odors, has a phytate content which is at least about 40 percent less than that of alkaline extracted protein and wherein the acyl groups of said modified protein are acetyl groups.

15. A dry coffee whitener formulation having improved stability against feathering which comprises about 35 – 65 percent by weight of a water soluble sugar, about 20 – 50 percent by weight of an edible fat, and about 3 – 15 percent by weight of an edible essentially unhydrolyzed modified protein having at least about 30 acyl groups per $10^5$ grams of protein, said modified protein having a mild flavor, essentially no odor, exhibiting absence of feathering in coffee and tea, having a lowered phytin content, having a reduced viscosity, the electrophoretic pattern of which exhibits distinctive broad bands, and having an essentially unimpaired amino acid content.

16. The coffee whitener defined in claim 15 in which the protein is selected from the group consisting of vegetable protein, animal protein, salts derived from animal protein and combinations thereof.

17. The coffee whitener defined in claim 15 in which the formulation also contains about 1 –3 percent by weight of an emulsifier selected from the group consisting of mono- and diglycerides, diacetyl tartaric acid esters of mono- and diglycerides, propylene glycol monostearate, and combinations thereof and 0.5–5 percent of a stabilizing salt.

18. The method of making a coffee whitener having improved stability against feathering which comprises admixing an edible fat, a water soluble sugar, and an edible essentially unhydrolyzed modified protein having at least about 30 acyl groups per $10^5$ grams of protein and contacting said mixture with water having a temperature of at least about 160° F. to form a water-fat emulsion, said modified protein having a mild flavor, essentially no odor, exhibiting absence of feathering in coffee and tea, having a lowered phytin content, having a reduced viscosity, the electrophoretic pattern of which exhibits distinctive broad bands, and having an essentially unimpaired amino acid content.

19. The method defined in claim 18 in which the protein is selected from the group consisting of vegetable proteins, animal proteins, salts derived from animal proteins, and combinations thereof.

20. The method defined in claim 18 in which said water-fat emulsion is pasteurized, homogenized, and spray dried to provide a coffee whitener in dry powder form.

21. The method defined in claim 19 in which the modified protein is provided by contacting an aqueous alkaline medium containing an essentially unhydrolyzed, edible protein having epsilon amino groups with a modifying agent selected from the group consisting of acyl-bearing anhydrides, ketene and lactone compounds in a concentration and for a period of time sufficient for the modifying agent to essentially completely react with functional groups of the protein which are electro-netative in character and have replaceable hydrogen atoms.

22. The method defined in claim 21 in which the modified protein is separated from the aqueous reaction medium after completion of the modification reaction by precipitation at its isoelectric point, the modified protein is washed and dried and the dried modified protein is admixed with the edible fat and the water soluble sugar, and the admixture is contacted with water having a temperature of at least about 160° F. to form a water-fat emulsion.

* * * * *